United States Patent Office 2,907,630
Patented Oct. 6, 1959

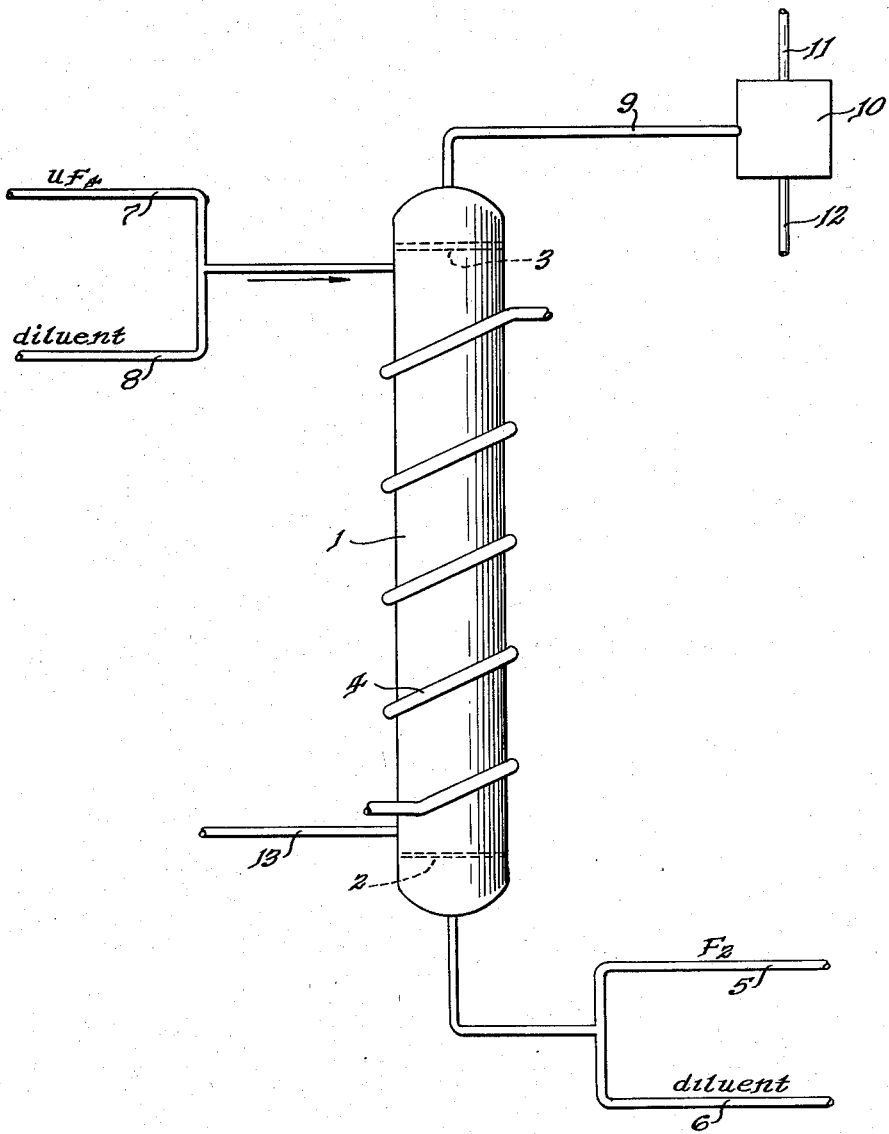

2,907,630

PREPARATION OF URANIUM HEXAFLUORIDE

Stephen Lawroski, Naperville, Albert A. Jonke, Elmhurst, and Robert K. Steunenberg, Naperville, Ill., assignors to the United States of America as represented by the United States Atomic Energy Commission Application February 6, 1958, Serial No. 713,773

4 Claims. (Cl. 23—14.5)

This invention relates to one step in a complete process for preparing uranium hexafluoride from ore concentrates. In more detail the invention relates to the preparation of uranium hexafluoride from crude uranium tetrafluoride by reacting uranium tetrafluoride with fluorine in a fluidized bed.

Fluidization may be described briefly as the phenomenon which occurs when a gas passes upwardly through a bed of solid particles at sufficient velocity to prevent the particles from remaining in intimate contact with one another. In this condition a certain degree of freedom to move is imparted to the solid particles. In the fluidized state the solid-gas phase behaves much like a liquid having the ability to flow readily under the influence of a hydrostatic head.

The use of the fluidized bed technique has significant advantages in reactions involving gas and a finely divided solid. These advantages may be summarized as follows: (1) the mobility of the fluidized solids permits ready transfer of solids to and from a reaction vessel, thereby permitting continuous operation; (2) excellent temperature control is obtainable; (3) high heat transfer coefficients are obtained between the solid particles and a heating or cooling surface; and (4) high reaction rates are obtained because of the large surface area of the fluidized particles.

Production of uranium hexafluoride from uranium ores now comprises a multiple step process including leaching the ore, dissolution of the ore concentrate in nitric acid, purification by solvent extraction, denitration, reduction, hydrofluorination to uranium tetrafluoride, and fluorination to uranium hexafluoride.

A simpler scheme which eliminates the solvent extraction and denitration steps and employs fractional distillation of uranium hexafluoride for purification of uranium can be employed. According to this scheme the ore concentrate obtained from a leaching step, which is in the form of fine powder, is briquetted, crushed, and screened to a form which is suitable for fluidization. The concentrate is then reduced and hydrofluorinated in a fluidized bed reactor. The apparatus used for this may be the apparatus disclosed and claimed in application Serial No. 653,722, filed April 18, 1957. The resulting uranium tetrafluoride is then fluorinated in a fluidized bed reactor and the resulting uranium hexafluoride purified by fractional distillation.

It has been found that reduction and hydrofluorination can be conducted successfully on a variety of ore concentrates in fluidized bed reactors. For successful operation of the complete process, it is essential that the reaction between uranium tetrafluoride and fluorine be carried out without any difficulties that would interfere with continuous operation of the process. We have found this reaction can be carried out on crude uranium tetrafluoride obtained by reduction and hydrofluorination of ore concentrates provided certain procedures are followed to assure good fluidization characteristics of the crude uranium tetrafluoride.

It is accordingly an object of the present invention to provide a method for the conversion of uranium tetraflouride to uranium hexafluoride in a fluidized bed.

It is a more specific object of the present invention to provide a method of reacting crude uranium tetrafluoride, obtained by reduction and hydrofluorination of ore concentrates, with fluorine in a fluidized bed.

These and other objects of the present invention are accomplished by diluting the uranium tetrafluoride in the bed with at least an equal quantity of an inert diluent to obtain good fluidization characteristics for the uranium tetrafluoride and prevent caking and sintering in the bed. In addition, it is desirable to dilute the fluorine reactant with a gaseous diluent.

The invention will now be described with reference to the accompanying drawing which shows a diagrammatic representation of a fluidized bed reactor in which our method can be carried out.

In the drawing the number 1 denotes the fluidized bed reactor, 2 is a perforated gas diffusion disk, 3 is a metal filter, 4 is a cooling coil, 5 is an inlet line for fluorine, 6 is an inlet line for a gaseous diluent, 7 is an inlet line for uranium tetrafluoride, 8 is an inlet line for an inert solid diluent, 9 is the off-gas line, 10 is one or a series of cold traps, 11 is an outlet line for noncondensible gases, 12 is the product uranium hexafluoride line, and 13 is an outlet line for solid diluent and ash. Operation of the reactor is conventional; uranium tetrafluoride is introduced into the reactor from the top and fluorine from the bottom. The reaction of fluorine with uranium tetrafluoride yields gaseous uranium hexafluoride which is taken off through the off-gas line at the top while the ash is removed from the bottom. Filter 3 is provided to prevent fine solid particles from being carried into the off-gas line. The product is removed from the off-gas by cold traps 10. Cooling coil 4 is provided to remove the heat liberated by the reaction.

One of the essential features of the present invention resides in the addition of an inert diluent to the bed. One diluent which has been used and found satisfactory is calcium fluoride. The diluent serves a multiplicity of purposes. In the first place the diluent is added to form a carrier bed. Since the product of the reaction of uranium tetrafluoride with fluorine is a gas, most of the material in the feed will be vaporized. The diluent provides a carrier with which the nonvaporized impurities in the feed may be removed from the reactor. In addition, presence of the diluent serves to dampen the quite vigorous reaction of uranium tetrafluoride with fluorine. Because of the vigor with which the reaction proceeds most of the uranium tetrafluoride reacts immediately after it is fed into the reactor. It would therefore be difficult to maintain a uniform bed in the reactor without the diluent. A uniform bed is of course necessary in order to get uniform fluidization of the particles in the bed. For these reasons it is desirable that a diluent be employed even though compelling reasons for its use are not present.

A very important consideration in the feasibility of the complete process for the preparation of uranium hexafluoride from ore concentrates resides in the ease with which the product of the hydrofluorination step can be used directly in the fluorination reactor. It is, of course, desirable for a practical commercial process that this material be fed continuously into the fluorination reactor without any intermediate preparatory steps. It has been found that the source of the uranium tetrafluoride is very important in this connection. Purified uranium tetrafluoride obtained from other methods of preparation can be fluidized easily and can be fluorinated without a diluent. For the reasons previously advanced, however, a diluent should be used with this material. Uranium tetrafluoride prepared from ore concentrates differs radically depending on whether the concentrate was obtained by acid leaching or carbonate leaching.

It has been found that it is absolutely essential to employ a diluent with uranium tetrafluoride prepared from a concentrate obtained by the carbonate-leach method. It is believed that the reason for this is the sodium fluoride present in the impure uranium tetrafluoride. Because of the difference in atomic weights a small amount of sodium fluoride will be sufficient to complex a large amount of uranium tetrafluoride. There is a sufficient amount of sodium fluoride present in the crude uranium tetrafluoride to complex most of the uranium as a sodium fluoride-uranium tetrafluoride complex.

Although the melting points of sodium fluoride and uranium tetrafluoride are relatively high—995° C. and 1030° C., respectively—melting points of various complexes which may be formed are much lower—in the range 600° C. to 700° C. This lowering of the melting point produces a corresponding lowering of the sintering temperature. Therefore, the crude uranium tetrafluoride will sinter and cake at the temperatures present in the reactor if no diluent is present. The diluent prevents sintering and caking by separating the particles.

A diluent also improves the fluidization characteristics of uranium tetrafluoride prepared from acid-leach concentrates. The fluidization characteristics of the uranium tetrafluoride will depend on the source of the ore, the amount and character of impurities in the ore and the size of the particles. By removing particles sized larger than 40 mesh from some feeds prepared from the acid-leach concentrates, a material having good fluidization character is obtained. It is not essential that a diluent be added to such feeds. Other feeds prepared from acid-leach concentrates have such poor fluidization characteristics that a diluent is essential. It will be noted that improved results are obtained from adding a diluent to feeds having good fluidization properties so that according to the present invention a diluent is added even though the fluorination reaction could be carried out without a diluent.

At least an equal quantity of diluent is added to the crude uranium tetrafluoride. Preferably the mixture of uranium tetrafluoride and diluent should include about 75% by weight of diluent.

The diluent must be one that does not introduce impurities into the product. Therefore, a fluoride is indicated. The fluoride must be one which does not react with fluorine. Calcium fluoride and magnesium fluoride of suitable particle size are satisfactory. Crystalline calcium fluoride, for example, screend to +100 mesh and having a tapped bulk density of 1.7 g./ml. is satisfactory. A mixture of 50 weight percent crude uranium tetrafluoride in calcium fluoride fluidized somewhat better than did the uranium tetrafluoride alone. A mixture of 75 weight percent calcium fluoride fluidized as easily as the calcium fluoride alone and there was no caking at the gas distribution disk in the bottom of the reactor.

The rate of the reaction is dependent on temperature. The satisfactory temperature range lies between 300 and 600° C. Since caking becomes substantial over 450° C. the preferred temperature of operation is about 450° C.—the maximum at which operation can be carried out without caking. For the more difficultly fluidizable carbonate leach feed, the maximum temperature which can be used is somewhat lower so that the range is between 300° and 450° C. Optimum temperature is near the top of this range.

It is desirable to introduce fluorine into the reactor in admixture with an inert gaseous diluent. The reaction of pure fluorine and uranium tetrafluoride is so vigorous that an inert diluent is desirable to control the reaction. Near the upper limit of the temperature range fluorine will burn in uranium tetrafluoride. Near the bottom limit of the range pure fluorine can be used. A satisfactory diluent is nitrogen in a mole ration of $F_2$ to $N_2$ of between 0.10 and 0.90. The fluorine concentration in the fluidizing gas stream does not affect the fluorine efficiency appreciably, but it does have a strong influence on the rate of uranium hexafluoride production.

Experiments which indicate the desirability and in some cases necessity of employing an inert diluent will next be described.

The first experiments were carried out in a metal tube which was one inch in diameter. A resistance heater was employed to obtain the desired temperatures and no cooling means were found necessary. The feed was a Rand South African ore concentrate reduced and hydrofluorinated in 3-inch fluidized beds at 450° C. The experiments were carried out on crude uranium tetrafluoride with poor fluidization characteristics. Therefore, use of the inert diluent was essential to obtain satisfactory performance of the reactor. Screen analysis of a typical sample is as follows:

TABLE I

| Sieve No.: | Percent |
| --- | --- |
| +20 | 2.1 |
| −20 +40 | 29.5 |
| −40 +60 | 11.5 |
| −60 +100 | 12.2 |
| −100 +200 | 13.8 |
| −200 +325 | 9.3 |
| −325 | 21.6 |

A summary of the results and a description of the runs follows:

TABLE II

*The fluorination of crude uranium tetrafluoride in a one-inch fluidized bed reactor*

Gas stream: 0.073 g./min. $F_2$ diluted with $N_2$ to give a gas flow of 1,500 cc./min. in the reactor.

Bed contents: 25 weight percent crude uranium tetrafluoride; 75 weight percent $CaF_2$ (+100 mesh).

| Run No. | Initial Bed Composition | | | Fluorine Addition Data | | |
| --- | --- | --- | --- | --- | --- | --- |
| | $CaF_2$ (g.) | Crude $UF_4$[a] (g.) | Bed Temp. (°C.) | Stoichiometric Equivalents of Fluorine Added [b] | Time (min.) | Fluorine Efficiency [c] (percent) |
| 10A | 56.2 | 18.8 | 450 | 1 | 30 | 50 |
| B | | | 450 | 1 | 30 | 44 |
| 11A | 56.2 | 18.8 | 450 | 1 | 27 | 62 |
| B | | | 450 | [d] 1 | 29 | 62 |
| C | | | 450 | Excess | | [f] |
| 13A | 56.2 | 18.8 | 450 | 1 | 30 | 67.5 |
| B | | (e) | 450 | 1 | 30 | 68.8 |
| C | | (e) | 450 | 1 | 30 | 67.5 |
| D | | (e) | 450 | 1 | 30 | 67.5 |
| E | | (e) | 450 | 1 | 30 | 65.5 |
| F-1 | | (e) | 450 | 1 | 30 | |
| 14A | 56.2 | 18.8 | 400 | 1 | 20 | 52.3 |
| B | | (e) | 300 | 1 | 30 | 45.6 |
| C | | (e) | 200 | 1 | 30 | 21.5 |
| D | | (e) | 150 | 1 | 30 | 10.3 |
| E | | (e) | 100 | 1 | 30 | 0.5 |
| 18A | 56.2 | 18.8 | 100 | 1 | 30 | 1.05 |
| B | | (e) | 150 | 1 | 30 | 0.4 |
| C | | (e) | 200 | 1 | 30 | 12.8 |
| D | | (e) | 250 | 1 | 30 | 49.1 |
| E | | (e) | 300 | 1 | 30 | 49.6 |
| F | | (e) | 350 | 1 | 30 | 48.6 |
| G | | (e) | 400 | 1 | 30 | 46.0 |
| I | | (e) | 450 | 1 | 30 | 48.4 |
| J | | (e) | 500 | 1 | 30 | 38.3 |

[a] Purity 95.4 percent.
[b] One stoichiometric equivalent of fluorine is that required for the reaction $UF_4 + F_2 = UF_6$.
[c] Fluorine efficiency is defined as moles of $UF_6$ collected/moles of $UF_4$ initially present for one stoichiometric equivalent of fluorine.
[d] Based on the unreacted uranium tetrafluoride remaining in the bed.
[e] Uranium tetrafluoride added to restore the bed to its original composition.
[f] 95% of $UF_6$ collected.

*Run 10.*—About 94 percent of the uranium was collected as the hexafluoride. Two stoichiometric equivalents of fluorine were added separately, the collection traps being replaced between the additions. During the first addition the fluorine efficiency was about 50 percent.

*Run 11.*—It was demonstrated that practically all the uranium was removed from the bed by the addition of excess fluorine. The stoichiometric equivalent of fluorine added initially showed an efficiency of 62 percent. Additional fluorine, corresponding to the uranium tetrafluoride remaining in the bed, again gave 62 percent efficiency. Excess fluorine was then passed through the bed to remove as much of the uranium as possible. About 95 percent of the uranium was collected as the hexafluoride during the three fluorine additions.

*Run 13.*—It was shown that the fluorination reaction in the fluidized bed could be operated on a semi-continuous basis to produce about 100 g. of uranium hexafluoride. Nine cycles were carried out, each cycle representing the addition of a stoichiometric equivalent of fluorine, and the addition of enough crude uranium tetrafluoride to return the bed to its original composition. In the first cycle an average fluorine efficiency of about 67 percent was realized, the highest obtained in any of the runs. At the end of the fifth cycle some plugging occurred in the gas distribution plate at the bottom of the bed. The minor difficulties encountered were believed to result from the design of the small laboratory-scale equipment.

*Run 14.*—An effort was made to gain a rough indication of the temperature dependence of the reaction. Operationally, the procedure was identical to that of run 13, except that the temperature of the bed was varied. A strong temperature effect was shown by the fluorine efficiency, which dropped to 0.5 percent at 100° C.

*Run 18.*—An additional experiment was performed in which the reactor was operated semi-continuously, the temperature being changed with each addition of uranium tetrafluoride. The operation was similar to that in run 14, except that the temperature was changed in reverse order with the lower temperatures first, and a 2-inch extension doubling the length of the reactor was used. Both runs agreed in showing that the rate of fluorination below 250° C. was slow. In run 14, however, the fluorine efficiency increased with temperature, while in run 18 the fluorine efficiency was essentially constant in the 250–450° C. range. The differences in the two runs may be explained, at least partially, by work which indicates that the fluorination rate of uranium tetrafluoride is about four times as fast as the fluorination of uranium fluorides intermediate between the tetrafluoride and the hexafluoride. In run 14 it is believed that the fluorination was primarily that of uranium tetrafluoride until the temperature had been reduced below 250° C. In run 18 the fluorination was probably that of the uranium intermediates which had consumed part of the fluorine in their formation. At 250° C. uranium tetrafluoride began to be fluorinated along with the intermediates. The lower values at 500° C. are probably due to caking.

Experiments were also carried out with the crude uranium tetrafluoride produced from Anaconda carbonate ore concentrate. It was necessary to screen the sample to —60 mesh in order to attain satisfactory fluidization. Very little uranium hexafluoride was produced from the charge in the reactor. When the reactor was opened, a plug of green sintered material was discovered, extending for a considerable length in the one-inch pipe.

Due to the sintering tendency exhibited by the carbonate-leach uranium tetrafluoride, calcium fluoride diluent was added to the bed to improve fluidization. The results of several experiments are listed in Table III.

TABLE III

*Fluorination of crude carbonate-leach uranium tetrafluoride in a fluidized-bed reactor*

Total flow rate: 3146 cc./min.
Temperature: 450° C.
Bed contents: 25% carbonate leach-uranium tetrafluoride (18.8 g.)+75% CaF$_2$

| Run No. | Mole Ratio, F$_2$/N$_2$ | Time (min.) | F$_2$ Efficiency, Percent (U Volatilized)/ Initial U | U Volatilized with Excess F$_2$ (Percent) | U Balance, Percent | Remarks (Also see text) |
|---|---|---|---|---|---|---|
| 27 | 0.02 | 48 | | 51.5 | 64.4 | Preliminary experiment. Flow rate 6,292 cc./min. instead of usual 3,146 cc./min. due to unfavorable particle size of the CaF$_2$. Some caking of material in bed. |
| 30 | 0.04 | 65 | 48.4 | 84.7 | 90.0 | Preliminary experiment. One of the fluorothene tubes containing UF$_6$ ignited in the stream of pure F$_2$. Some caking of material in bed. |
| 33 | 0.72 | 2.15 | 35.3 | | 108.8 | Large cake about the diam. of the reactor tube present in bed. |
| 34 | 0.72 | 2.15 | 20.8 | | 96.4 | Slight caking of material in bed. |
| 35 | 0.72 | 30 | | 99.8 | 106.1 | |

*Run 27.*—A preliminary experiment using thirty percent more fluorine than is stoichiometrically required was performed to establish whether or not the uranium could be volatilized from the bed by fluorination of the carbonate-leach uranium tetrafluoride. The high fluidizing velocity required in this experiment may have been at least partially responsible for the low percentage of uranium volatilized; it is suggested that the reactivity of the carbonate-leach uranium tetrafluoride may be less than that of crude uranium tetrafluoride from the other sources.

*Run 30.*—An experiment was performed to determine the approximate fluorine efficiency and the total amount of uranium that could be volatilized. Twenty percent excess fluorine was added in the first 30 minutes of the experiment, excess fluorine was added during the next 30 minutes, and pure fluorine was added during the final 5 minutes of the experiment. Since the main objective of the run was to establish the total amount of uranium that could be volatilized, the fluorine efficiency was based only on the uranium hexafluoride in the cold trap and did not include that held in lines or collected in the sodium hydroxide scrubber. It is estimated, however, that the error in the fluorine efficiency should not exceed about 20 percent of the value quoted in the table. Two other operational difficulties may have contributed minor errors in the uranium data. One of the fluorothene tubes in the off-gas line ignited during the run, and some of the bed contents were lost through the gas distribution plate. The results do indicate, however, that better efficiencies and uranium recoveries were possible than those obtained in the previous experiments.

*Runs 33–34.*—The purpose of these runs was to check the fluorine efficiencies using stoichiometrically equivalent amounts of fluorine with the carbonate-leach uranium tetrafluoride. Although caking and sintering were present, it appeared that this material was less reactive than that from the other sources.

*Run 35.*—It was found that a sufficiently large excess of fluorine would volatilize most of the uranium from the bed.

It is thus apparent that use of an inert diluent makes it possible to fluorinate crude uranium tetrafluoride in a fluidized bed reactor where the crude uranium tetrafluoride has such characteristics that it otherwise could not be satisfactorily fluorinated in a fluidized bed reactor.

In general it was found that the carbonate-leach uranium tetrafluoride was much more difficult to handle than that from the other two sources due to its low sintering temperature and apparent lack of reactivity. By using an easily fluidized inert diluent and with an optimum choice of conditions, however, it appears that it can be handled satisfactorily in a fluidized-bed fluorination.

Heat removal required no special arrangements in the laboratory experiments described, but in a larger scale unit provisions for cooling are necessary.

Uranium hexafluoride obtained by the procedure described has been purified to a very great extent over that present in the ore concentrate. It requires further purification, however, before it can be used in a diffusion process. This is accomplished by fractional distillation.

It will be understood that this invention is not to be limited to the details given herein but that it may be modified within the scope of the appended claims.

What is claimed is:

1. A process for preparing uranium hexafluoride from a carbonate-leach concentrate of uranium ore comprising briquetting, crushing and screening the concentrate to obtain a material suitable for fluidization, reducing and hydrofluorinating the concentrate in fluidized bed reactors, fluorinating the resulting crude uranium tetrafluoride in admixture with at least an equal quantity of an inert solid diluent in a fluidized bed reactor, and purifying the resulting uranium hexafluoride by fractional distillation.

2. The process of claim 1 wherein the inert solid diluent is calcium fluoride.

3. The process of claim 2 wherein the fluorination is carried out by introducing the fluorine into the bed in admixture with an inert gaseous diluent.

4. The process of claim 3 wherein the inert gaseous diluent is nitrogen.

References Cited in the file of this patent

UNITED STATES PATENTS

| | | |
|---|---|---|
| 2,756,125 | Abelson | July 24, 1956 |
| 2,758,021 | Drapeau | Aug. 7, 1956 |
| 2,804,369 | Fowler | Aug. 27, 1957 |
| 2,811,414 | Murphree | Oct. 29, 1957 |
| 2,855,271 | Libby | Oct. 7, 1958 |
| 2,863,735 | Brater et al. | Dec. 9, 1958 |

FOREIGN PATENTS

| | | |
|---|---|---|
| 656,374 | Great Britain | Aug. 22, 1951 |